(12) United States Patent
Feng et al.

(10) Patent No.: US 10,668,686 B2
(45) Date of Patent: Jun. 2, 2020

(54) LAMINATED COMPOSITE MATERIAL AND METHOD FOR MAKING THE SAME

(71) Applicant: SAN FANG CHEMICAL INDUSTRY CO., LTD., Kaohsiung (TW)

(72) Inventors: Chung-Chih Feng, Kaohsiung (TW); Pai-Hsiang Wu, Kaohsiung (TW); Chien-Chia Huang, Kaohsiung (TW); Chieh Lee, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 183 days.

(21) Appl. No.: 15/435,975

(22) Filed: Feb. 17, 2017

(65) Prior Publication Data

US 2017/0282488 A1 Oct. 5, 2017

(30) Foreign Application Priority Data

Mar. 30, 2016 (TW) .............................. 105109951 A

(51) Int. Cl.
*B32B 3/26* (2006.01)
*B32B 7/12* (2006.01)

(52) U.S. Cl.
CPC ................ *B32B 3/266* (2013.01); *B32B 7/12* (2013.01)

(58) Field of Classification Search
CPC ... B32B 7/12; B32B 3/266; B32B 2307/7265; B32B 5/26; B32B 2255/26; B32B 2255/02; B32B 2255/205; B32B 5/024
See application file for complete search history.

(56) References Cited

U.S. PATENT DOCUMENTS

| | | | | |
|---|---|---|---|---|
| 5,361,163 A | * | 11/1994 | Matsuda | G03B 21/60 |
| | | | | 264/1.9 |
| 2004/0081812 A1 | * | 4/2004 | Shao | A43B 5/02 |
| | | | | 428/292.1 |
| 2014/0174632 A1 | * | 6/2014 | Roman | C08J 5/24 |
| | | | | 156/87 |

FOREIGN PATENT DOCUMENTS

| | | |
|---|---|---|
| CN | 102124169 A | 7/2011 |
| CN | 203623051 U | 6/2014 |
| CN | 104552445 A | 4/2015 |
| JP | 2013080757 A | 5/2013 |
| TW | 201041742 A1 | 12/2010 |
| TW | 201313483 | 4/2013 |

OTHER PUBLICATIONS

Machine translation of CN 104552445; Publication date: Apr. 29, 2015.*

(Continued)

*Primary Examiner* — Vishal I Patel
(74) *Attorney, Agent, or Firm* — WPAT, P.C., Intellectual Property Attorneys; Anthony King

(57) ABSTRACT

The present invention relates to a laminated composite material and a method for making the same. The laminated composite material includes a base layer and a protection layer. The base layer includes a first surface, a second surface and a plurality of through holes. The second surface is opposite to the first surface. The through holes extend from the first surface of the base layer to the second surface to penetrate through the base layer. The protection layer is disposed on the first surface of the base layer, and has a plurality of penetration holes. Sizes and locations of the penetration holes correspond to those of the through holes.

5 Claims, 8 Drawing Sheets

(56) References Cited

OTHER PUBLICATIONS

Machine translation of CN 203623051; Publication date: Jun. 4, 2014.*
Office Action and Search Report from SIPO for corresponding China application 201610506757.7 dated Sep. 29, 2018.
English Translated Search Report from SIPO for corresponding China application 201610506757.7.
English Abstract Translation of Foreign Document CN102124169A.
English Abstract Translation of Foreign Document CN104552445A.
English Abstract Translation of Foreign Document CN203623051U.
English Abstract Translation of Foreign Document JP2013080757A.
"Coating Composite Technology" (Jul. 31, 2011).
English Translation of "Coating Composite Technology".
English abstract translation of TW 201313483.
Office action and search report dated Dec. 9, 2016 for the corresponding Taiwan, R.O.C. Patent Application No. 105109951.
English abstract translation of the search report dated Dec. 9, 2016 for the corresponding Taiwan, R.O.C. Patent Application No. 105109951.
English abstract translation of TW 201041742A1.

* cited by examiner

LAMINATED COMPOSITE MATERIAL AND METHOD FOR MAKING THE SAME

BACKGROUND OF THE INVENTION

1. Field of the Invention

The present invention relates to a laminated composite material and a method for making the same, and particularly, to a laminated composite material with soft hand touch feeling and a method for making the same.

2. Description of the Related Art

Conventional mesh cloth, woven fabric, three-dimensional sandwich mesh cloth and other materials have disadvantages of being not waterproof, not antifouling and not wearproof. In order to improve the disadvantages, one solution is forming a protective film on an upper surface or a lower surface of the mesh cloth, the woven fabric or the three-dimensional sandwich mesh cloth. Such a manner may generally achieve a waterproof effect but cannot achieve an effect of antifouling, wear-resistance and the like. Alternatively, although the disadvantages of being not waterproof, not antifouling and not wearproof can be slightly improved; however, as the protective film completely covers the mesh cloth, the woven fabric or the three-dimensional sandwich mesh cloth, it is impossible to retain the original air permeability of the mesh cloth, the woven fabric or the three-dimensional sandwich mesh cloth, which results in hard hand touch feeling.

Therefore, it is necessary to provide an innovative and progressive laminated composite material and a method for making the same, so as to solve the above problems.

SUMMARY OF THE INVENTION

The present invention provides a laminated composite material, which comprises a base layer and a protection layer. The base layer has a first surface, a second surface and a plurality of through holes. The second surface is opposite to the first surface. The through holes extend from the first surface of the base layer to the second surface of the base layer to penetrate through the base layer. The protection layer is disposed on the first surface of the base layer and has a plurality of penetration holes. The sizes and locations of the penetration holes correspond to the sizes and locations of the through holes of the base layer.

The present invention further provides a method for making a laminated composite material, comprising: (a) providing a base layer, the base layer having a first surface, a second surface and a plurality of through holes, the second surface being opposite to the first surface, and the through holes extending from the first surface of the base layer to the second surface of the base layer to penetrate through the base layer; and (b) forming a protection layer on the first surface of the base layer, wherein the protection layer has a plurality of penetration holes, and the sizes and locations of the penetration holes correspond to the sizes and locations of the through holes of the base layer.

BRIEF DESCRIPTION OF THE DRAWINGS

The invention will be described according to the appended drawings, in which.

PREFERRED EMBODIMENT OF THE PRESENT INVENTION

Figure 1:
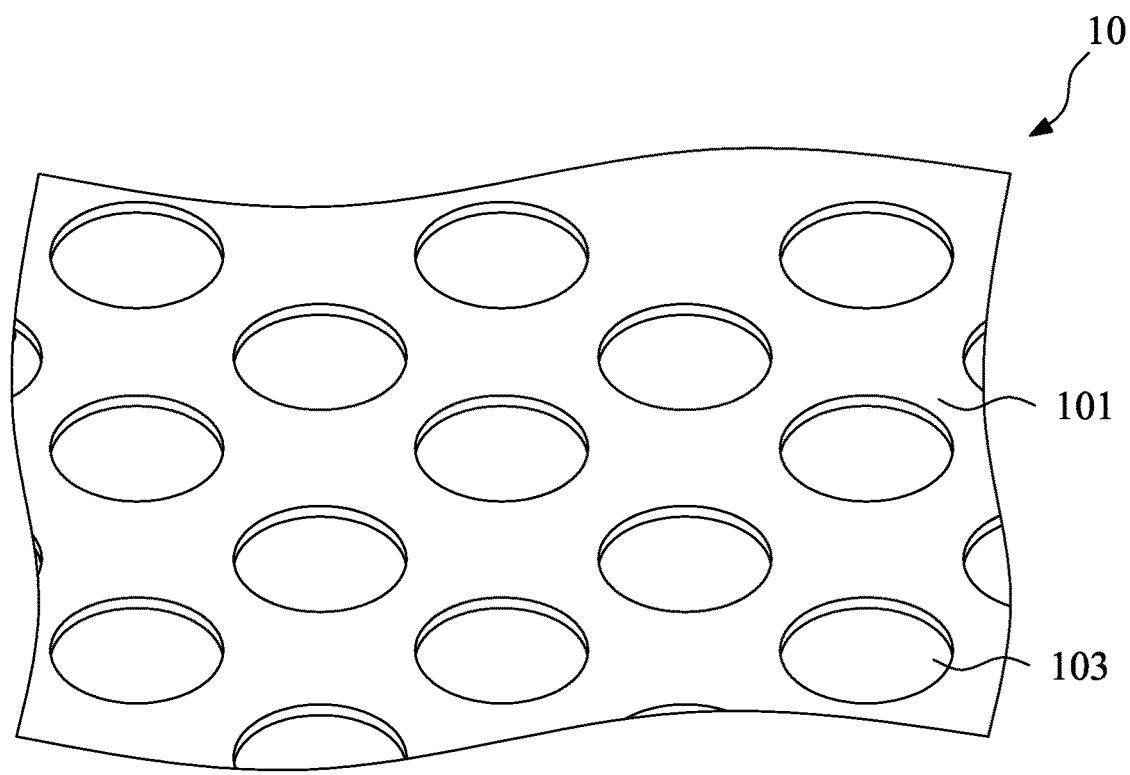
FIG. 1 to FIG. 5 illustrate schematic diagrams of process steps of a method for making a laminated composite material according to an embodiment the present invention.
Figure 2:
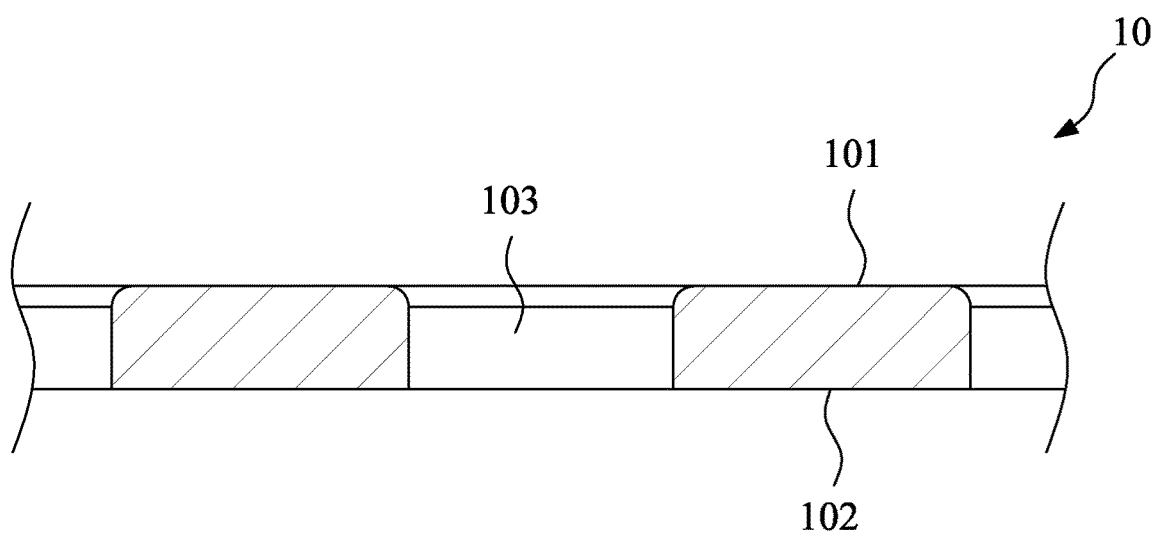

FIG. 1 to FIG. 5 illustrate schematic diagrams of process steps of a method for making a laminated composite material according to an embodiment the present invention. Referring to FIG. 1 and FIG. 2, a base layer 10 is provided, wherein FIG. 1 is a perspective schematic diagram of the base layer 10, and FIG. 2 is a cross-sectional schematic diagram of the base layer 10. The base layer 10 has a first surface 101, a second surface 102 and a plurality of through holes 103. The second surface 102 is opposite to the first surface 101, and the through holes 103 extend from the first surface 101 of the base layer 10 to the second surface 102 to penetrate through the base layer 10. The base layer 10 is a mesh cloth, a woven fabric or a three-dimensional sandwich mesh cloth.

Figure 3:
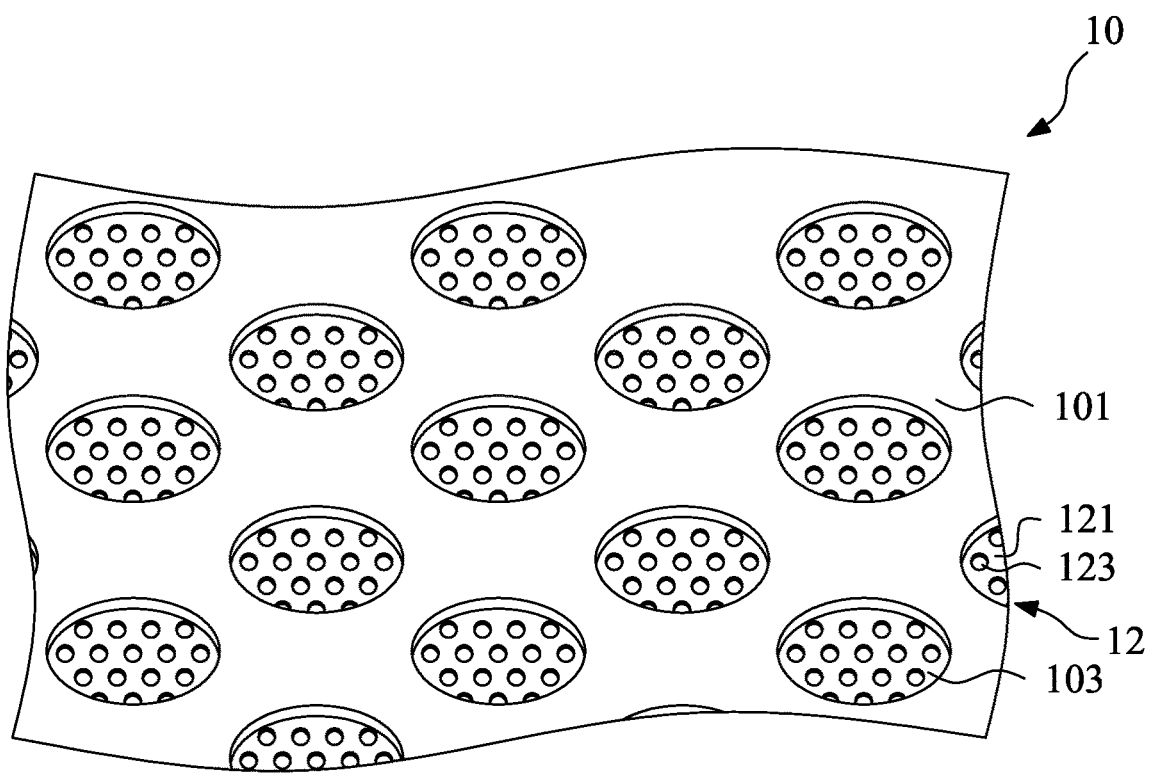
Figure 4:
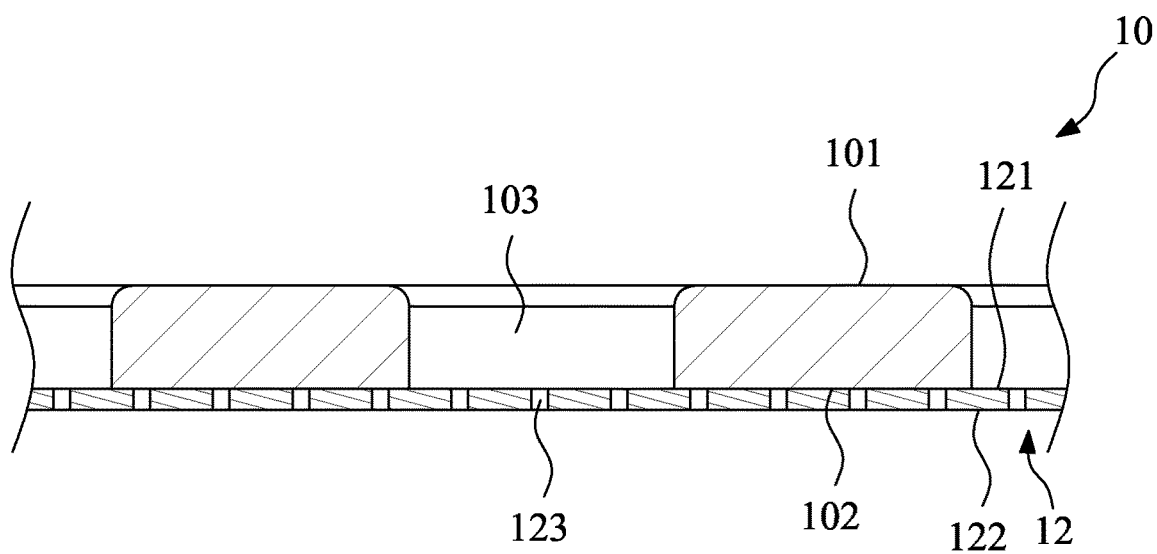

In other embodiments, referring to FIG. 3 and FIG. 4, a bottom layer 12 is further provided, wherein FIG. 3 is a perspective schematic diagram of the base layer 10 and the bottom layer 12, and FIG. 4 is a cross-sectional schematic diagram of the base layer 10 and the bottom layer 12. The bottom layer 12 is disposed on the second surface 102 of the base layer 10, and has a first surface 121, a second surface 122 and a plurality of air venting holes 123. The air venting holes 123 extend from the first surface 121 of the bottom layer 12 to the second surface 122 of the bottom layer 12 to penetrate through the bottom layer 12. The bottom layer 12 is a mesh cloth or a woven fabric. The first surface 121 of the bottom layer 12 contacts the second surface 102 of the base layer 10. The size of the air venting holes 123 of the bottom layer 12 is smaller than the size of the through holes 103 of the base layer 10.

Figure 5:
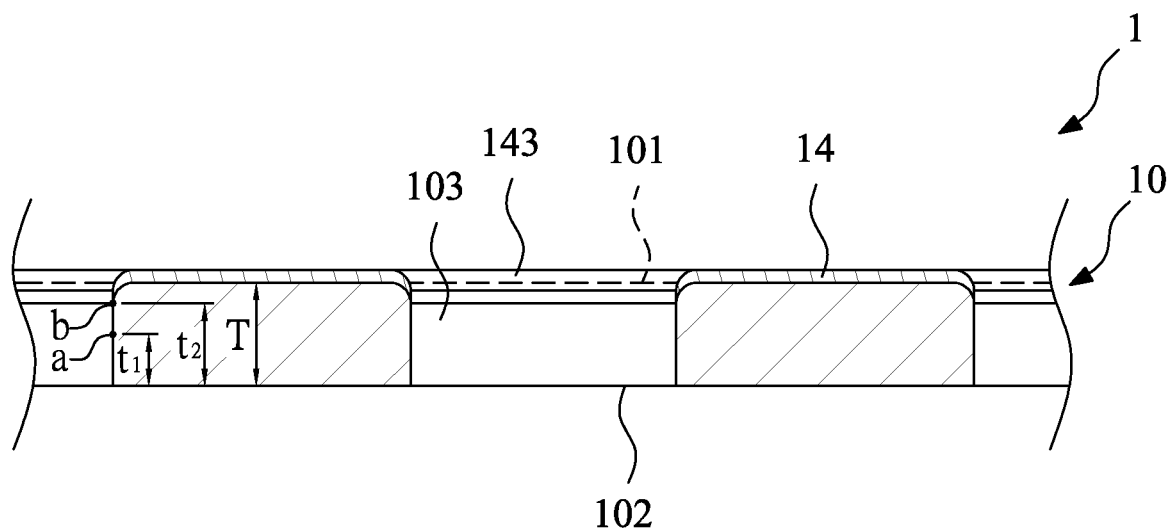

Referring to FIG. 5, a protection layer 14 is formed on the first surface 101 of the base layer 10. Next, the protection layer 14 is cured, so as to manufacture a laminated composite material 1. The protection layer 14 has a plurality of penetration holes 143, and the sizes and locations of the penetration holes 143 correspond to the sizes and locations of the through holes 103 of the base layer 10. That is, the entity portion of the protection layer 14 is merely disposed on the entity portion of the base layer 10, so that the protection layer 14 does not to cover the through holes 103 of the base layer 10. Therefore, the air permeability of the base layer 10 will not be affected, and the hand touch feeling of the laminated composite material 1 is relative soft.

In this embodiment, the thickness of the base layer 10 is T, that is, a distance between the first surface 101 and the second surface 102 of the base layer 10 is T. The protection layer 14 does not extend to the second surface 102 of the base layer 10. Preferably, the protection layer 14 is merely disposed on the first surface 101 of the base layer 10 but does not extend to sidewalls of the through holes 103. Alternatively, the protection layer 14 at most extends to a first location "a" of the sidewalls of the through holes 103, wherein a distance between the first location "a" and the second surface 102 is $t_1$, and $t_1$ is about T/2. Preferably, the protection layer 14 at most extends to a second location "b" of the sidewalls of the through holes 103, wherein a distance between the second location "b" and the second surface 102 is $t_2$, and $t_2$ is about 3T/4 or 4T/5.

In this embodiment, the protection layer 14 is formed by curing a hot melt adhesive or a high-solid-content layer. The material of the hot melt adhesive is a thermoplastic urethane (TPU) solution, the material of the high-solid-content layer is a polyurethane (PU) solution, a polycarbonate (PC) solution, a polyethylene (PE) solution or a polypropylene (PP) solution, and a solid content thereof is 20 wt % to 95 wt % or 25 wt % to 90 wt %.

In this embodiment, in the process step, the base layer 10 is continuously fed, and the protection layer 14 is continuously formed, so as to form a continuous production. The manner in which the protection layer 14 is formed is as follows. At first, a mesh treatment wheel is provided, the mesh treatment wheel is cylindrical, and a surface thereof has a plurality of grooves cross to each other to define a mesh number. The mesh number is 100. Next, a liquid material is attached to the grooves of the mesh treatment wheel, wherein the liquid material is the hot melt adhesive or the high-solid-content layer. Next, the mesh treatment wheel contacts the first surface 101 of the base layer 10 in a printing manner, so that the liquid material is adhered to the first surface 101 of the base layer 10 (that is, the entity portion of the base layer 10). Preferably, the liquid material is not disposed in the through holes 103 of the base layer 10; or the liquid material at most extends to the first location "a" or the second location "b" of the sidewalls of the through holes 103. Therefore, the liquid material does not cover the through holes 103 of the base layer 10. Finally, the liquid material is cured to form the protection layer 14.

Referring to FIG. 5 again, a schematic cross-sectional diagram of a laminated composite material 1 according to an embodiment the present invention is illustrated. The laminated composite material 1 includes a base layer 10 and a protection layer 14. The base layer 10 has a first surface 101, a second surface 102 and a plurality of through holes 103. The second surface 102 is opposite to the first surface 101, and the through holes 103 extend from the first surface 101 of the base layer 10 to the second surface 102 of the base layer 10 so as to penetrate through the base layer 10. The base layer 10 is a mesh cloth, a woven fabric or a three-dimensional sandwich mesh cloth.

The protection layer 14 is disposed on the first surface 101 of the base layer 10 and has a plurality of penetration holes 143. The penetration holes 143 extend through the protection layer 14. The sizes and locations of the penetration holes 143 correspond to the sizes and locations of the through holes 103 of the base layer 10. That is, the sizes of the penetration holes 143 are substantially the same as the sizes of the through holes 103, and the penetration holes 143 are disposed right above the through holes 103. In this embodiment, the protection layer 14 is formed by curing a hot melt adhesive or a high-solid-content layer. The material of the hot melt adhesive is a thermoplastic urethane (TPU) solution. The material of the high-solid-content layer is a polyurethane (PU) solution, a polycarbonate (PC) solution, a polyethylene (PE) solution or a polypropylene (PP) solution, and a solid content thereof is 20 wt % to 95 wt % or 25 wt % to 90 wt %. The protection layer 14 does not extend to the second surface 102 of the base layer 10. Preferably, the protection layer 14 is merely disposed on the first surface 101 of the base layer 10 but does not extend to sidewalls of the through holes 103. Alternatively, the protection layer 14 at most extends to the first location "a" or the second location "b" of the sidewalls of the through holes 103.

Since the protection layer 14 does not cover the through holes 103 of the base layer 10, the laminated composite material 1 has the advantages of waterproof, antifouling and wearproof. In addition, the laminated composite material 1 can have excellent air permeability, and the hand touch feeling of the laminated composite material 1 is relative soft.

In other embodiment, the laminated composite material 1 further includes the bottom layer 12 disposed on the second surface 102 of the base layer 10, as shown in FIGS. 3 and 4.

Figure 6:
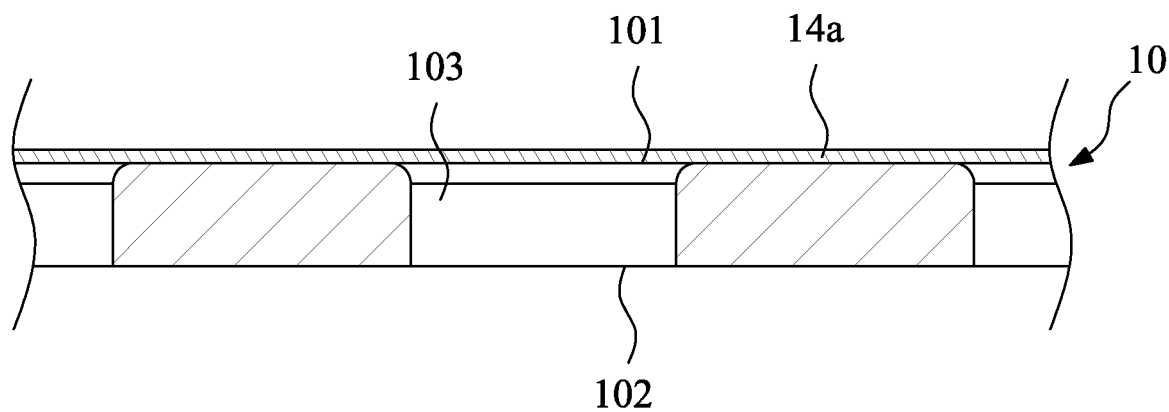
FIG. 6 to FIG. 7 illustrate schematic diagrams of process steps of a method for making a laminated composite material according to an embodiment the present invention.
Figure 7:
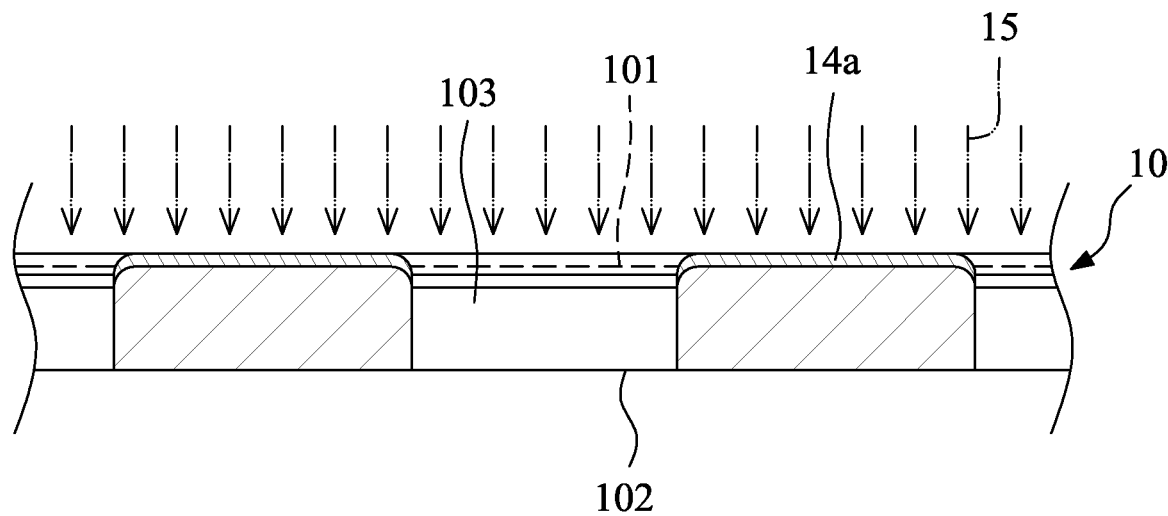

FIG. 6 to FIG. 7 illustrate schematic diagrams of process steps of a method for making a laminated composite material according to an embodiment the present invention. Referring to FIG. 6, the base layer 10 is provided. Then, a protective film 14a is provided. The protective film 14a is a sheet structure, and the size of the protective film 14a corresponds to the size of the base layer 10. The material of the protective film 14a is the hot melt adhesive or the high-solid-content layer as stated above. Then, the protective film 14a is disposed on the first surface 101 of the base layer 10. Meanwhile, the protective film 14a completely covers and adheres the base layer 10.

Referring to FIG. 7, a manner of forming holes by a hot air is implemented. A hot air 15 is provided above the protective film 14a. The hot air 15 blows toward the protective film 14a, to heat the protective film 14a, soften the protective film 14a and increase a flow coefficient of the protective film 14a, so as to blow away a part of the protective film 14a corresponding to the through holes 103 of the base layer 10. At this point, the other part of the protective film 14a remains on the entity part of the base layer 10 and is not blown away. The remaining protective film 14a at most extends to the first location "a" or the second location "b" of the sidewall of the through hole 103 but does not extend to the second surface 102 of the base layer 10; or the remaining protective film 14a is merely disposed on the first surface 101 of the base layer 10, but is not disposed in the through holes 103 of the base layer 10. Next, the protective film 14a remaining on the base layer 10 is cured, to form the protection layer 14, and the laminated composite material 1 is obtained, as shown in FIG. 5. It can be understood that the manner of forming holes by the hot air is also applicable to continuous production.

Figure 8:
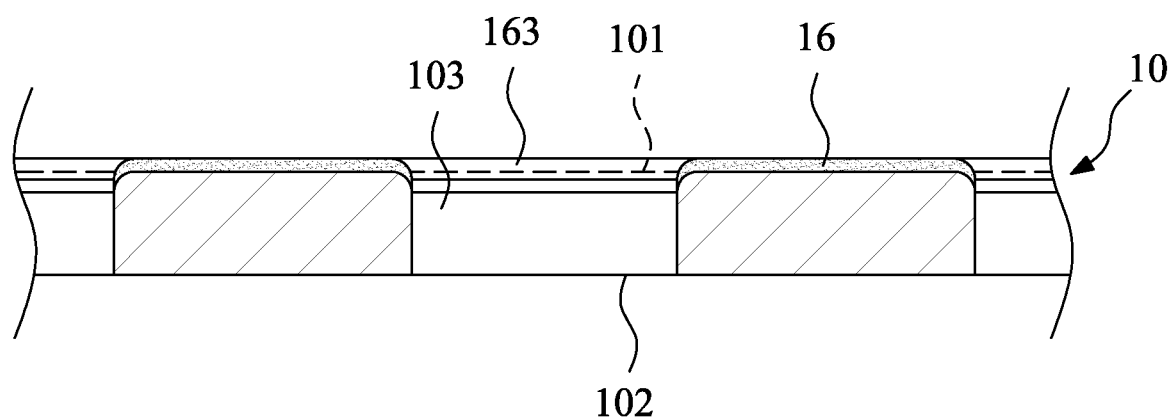
FIG. 8 to FIG. 9 illustrate schematic diagrams of process steps of a method for making a laminated composite material according to an embodiment the present invention.
Figure 9:
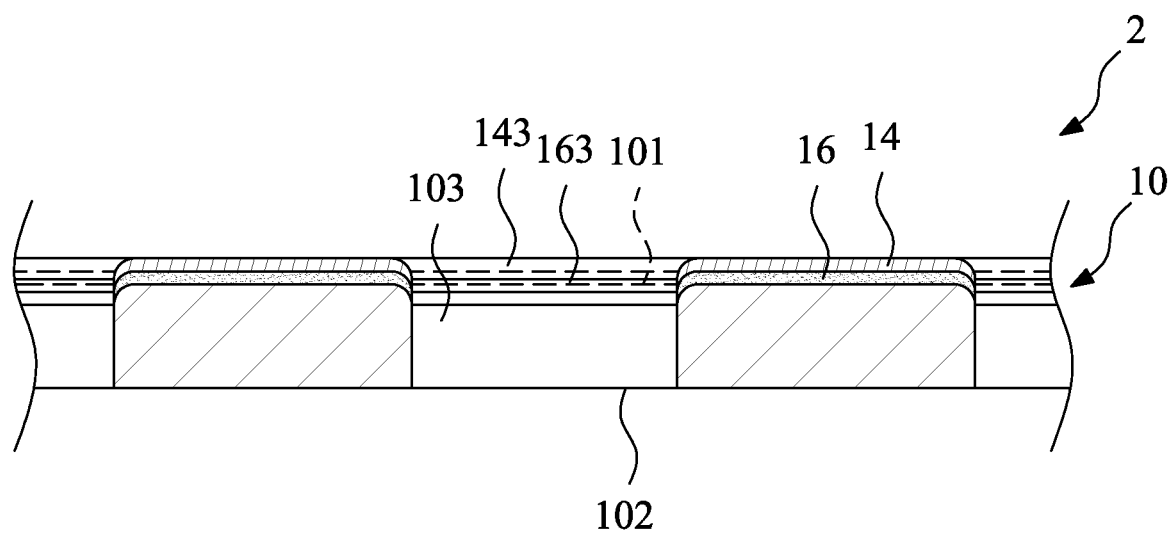

FIG. 8 to FIG. 9 illustrate schematic diagrams of process steps of a method for making a laminated composite material according to an embodiment the present invention. Referring to FIG. 8, the base layer 10 is provided. Then, an adhesive layer 16 is formed on the first surface 101 of the base layer 10. The adhesive layer 16 has a plurality of penetration holes 163. The penetration holes 163 extend through the adhesive layer 16. The sizes and locations of the penetration holes 163 of the adhesive layer 16 correspond to the sizes and locations of the through holes 103 of the base layer 10. In this embodiment, the material of the adhesive layer 16 is water-based PU (Polyurethane) resin, polycarbonate (PC) solution, epoxy solution or liquid hot melt adhesive. One embodiment of the above-mentioned water-based PU (Polyurethane) resin is SF6203 series manufactured by San Fang Chemical Industry Co., Ltd.

The adhesive layer 16 may be formed by the manner of the mesh treatment wheel or the hot air as stated above. In addition, the adhesive layer 16 at most extends to the first location "a" or the second location "b" of the sidewall of the through hole 103 but does not extend to the second surface 102 of the base layer 10; or the adhesive layer 16 is merely disposed on the first surface 101 of the base layer 10, but is not disposed in the through holes 103 of the base layer 10.

Referring to FIG. 9, the protection layer 14 is formed on the adhesive layer 16. The protection layer 14 may be formed by the manner of the mesh treatment wheel or the hot air as stated above. The protection layer 14 has a plurality of penetration holes 143. The penetration holes 143 extend through the protection layer 14. The sizes and locations of the penetration holes 143 correspond to the sizes and locations of the penetration holes 163 of the adhesive layer 16. That is, the sizes of the penetration holes 143 are substantially the same as the sizes of the penetration holes 163, and the penetration holes 143 are disposed right above the penetration holes 163. In one embodiment, the protection layer 14 is merely disposed on the top surface of the adhesive layer 16 but does not extend to sidewalls of the penetration holes 163. Alternatively, a portion of the protection layer 14 extends to an upper portion of the sidewall of the penetration hole 163 but does not completely cover the sidewall of the penetration hole 163.

Then, the adhesive layer 16 and the protection layer 14 are cured so as to obtain a laminated composite material 2. In other embodiment, the laminated composite material 2 further includes the bottom layer 12 disposed on the second surface 102 of the base layer 10, as shown in FIGS. 3 and 4.

Referring to FIG. 9 again, a schematic cross-sectional diagram of a laminated composite material 2 according to an embodiment the present invention is illustrated. The laminated composite material 2 of this embodiment is similar to the laminated composite material 1 as shown in FIG. 5, and the difference is described as follows. The laminated composite material 2 of this embodiment further includes an adhesive layer 16 disposed between the protection layer 14 and the base layer 10. The adhesive layer 16 has a plurality of penetration holes 163. The sizes and locations of the penetration holes 163 of the adhesive layer 16 correspond to the sizes and locations of the penetration holes 143 of the protection layer 14 and the through holes 103 of the base layer 10. The adhesive layer 16 is used to increase the adhesion force between the protection layer 14 and the base layer 10.

Figure 10:
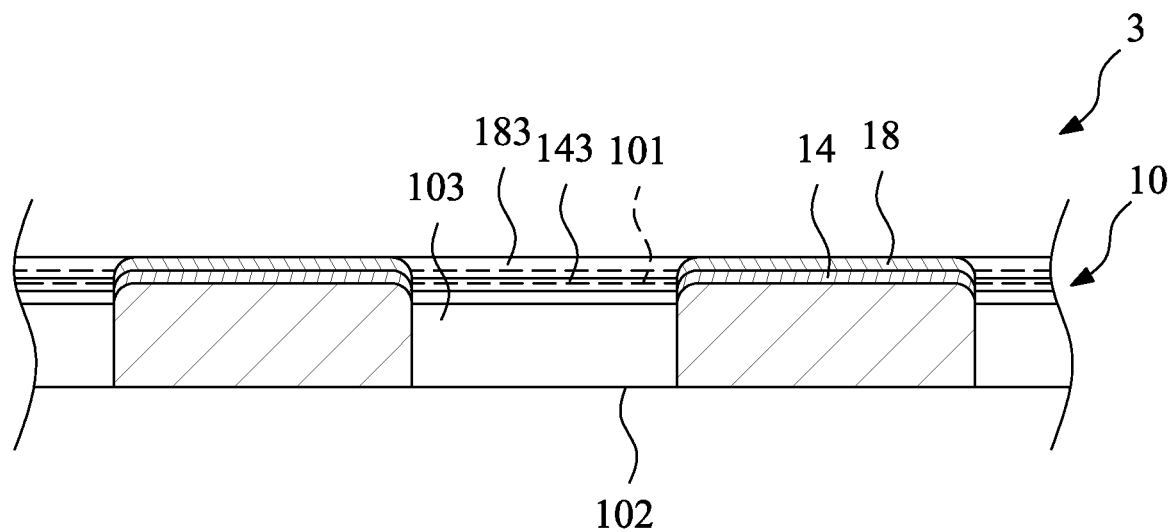
FIG. 10 illustrates a schematic cross-sectional diagram of a laminated composite material according to an embodiment the present invention.

FIG. 10 illustrates a schematic cross-sectional diagram of a laminated composite material 3 according to an embodiment the present invention. The laminated composite material 3 of this embodiment is similar to the laminated composite material 1 as shown in FIG. 5, and the difference is described as follows. The laminated composite material 3 of this embodiment further includes an anti-wear layer 18 disposed on the protection layer 14 and conformal with the protection layer 14. The anti-wear layer 18 does not cover the through holes 103. In this embodiment, the anti-wear layer 18 is formed on the protection layer 14. The anti-wear layer 18 has a plurality of penetration holes 183. The penetration holes 183 extend through the anti-wear layer 18. The sizes and locations of the penetration holes 183 of the anti-wear layer 18 correspond to the sizes and locations of the penetration holes 143 of the protection layer 14. In this embodiment, the material of the anti-wear layer 18 is water-based PU (Polyurethane) resin. One embodiment of the above-mentioned water-based PU (Polyurethane) resin is SF6203 series manufactured by San Fang Chemical Industry Co., Ltd.

The anti-wear layer 18 may be formed by the manner of the mesh treatment wheel or the hot air as stated above. In one embodiment, the anti-wear layer 18 is merely disposed on the top surface of the protection layer 14 but does not extend to sidewalls of the penetration holes 143. In another embodiment, a portion of the anti-wear layer 18 extends to an upper portion of the sidewall of the penetration hole 143 of the protection layer 14 but does not completely cover the sidewall of the penetration hole 143. The anti-wear layer 18 is used to increase the anti-wear property of the laminated composite material 3.

Figure 11:
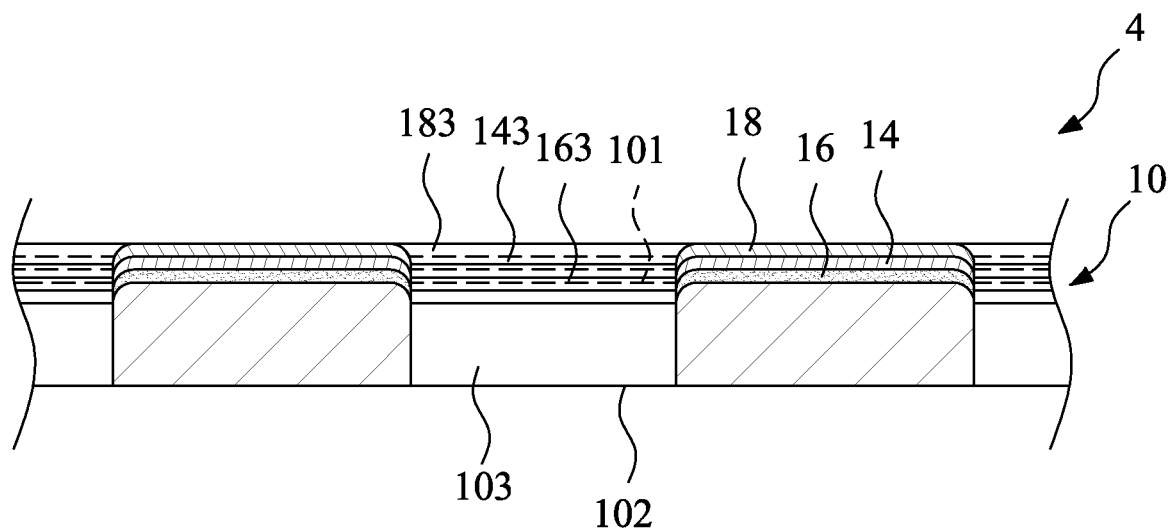
FIG. 11 illustrates a schematic cross-sectional diagram of a laminated composite material according to an embodiment the present invention.

FIG. 11 illustrates a schematic cross-sectional diagram of a laminated composite material 4 according to an embodiment the present invention. The laminated composite material 4 of this embodiment is similar to the laminated composite material 2 as shown in FIG. 9, and the difference is described as follows. The laminated composite material 4 of this embodiment further includes an anti-wear layer 18 disposed on the protection layer 14 and conformal with the protection layer 14. The anti-wear layer 18 does not cover the through holes 103. In this embodiment, the anti-wear layer 18 is formed on the protection layer 14. The anti-wear layer 18 has a plurality of penetration holes 183. The penetration holes 183 extend through the anti-wear layer 18. The sizes and locations of the penetration holes 183 of the anti-wear layer 18 correspond to the sizes and locations of the penetration holes 143 of the protection layer 14. In this embodiment, the material of the anti-wear layer 18 is water-based PU (Polyurethane) resin. The material of the anti-wear layer 18 is the same as or different from the material of the adhesive layer 16. The anti-wear layer 18 is used to increase the anti-wear property of the laminated composite material 4.

Figure 12:
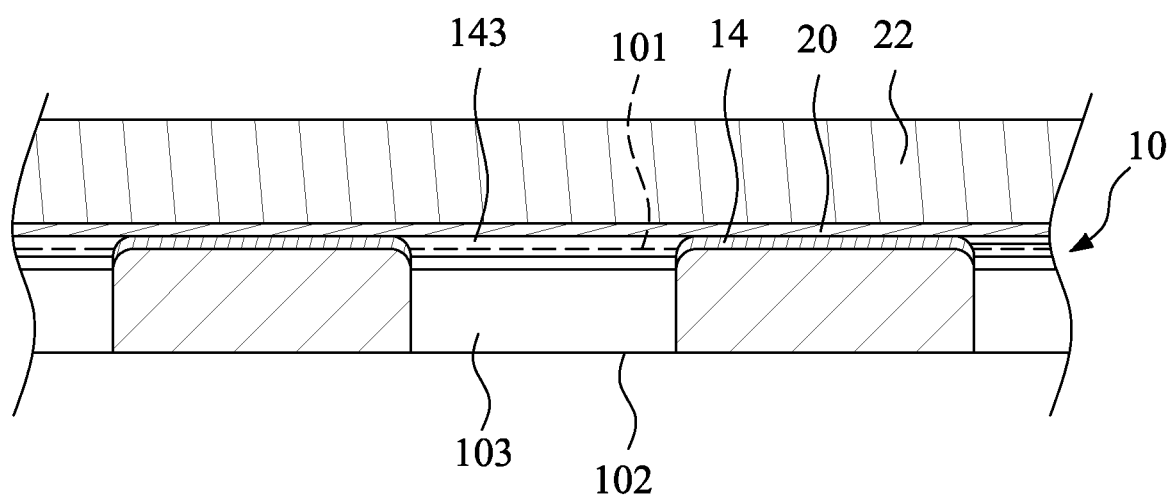
FIG. 12 to FIG. 14 illustrate schematic diagrams of process steps of a method for making a laminated composite material according an embodiment of the present invention.
Figure 13:
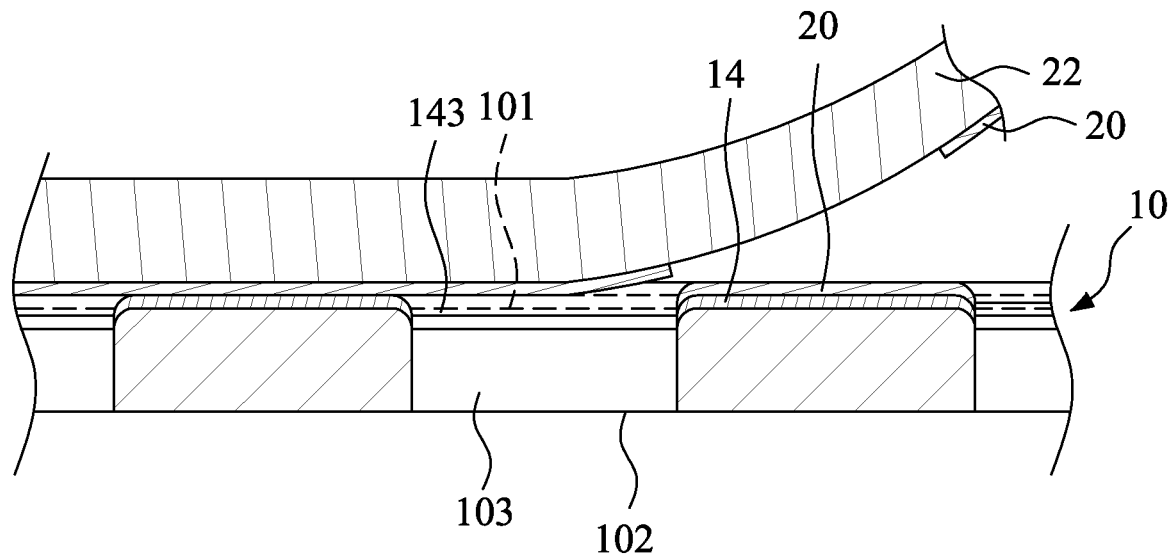
Figure 14:
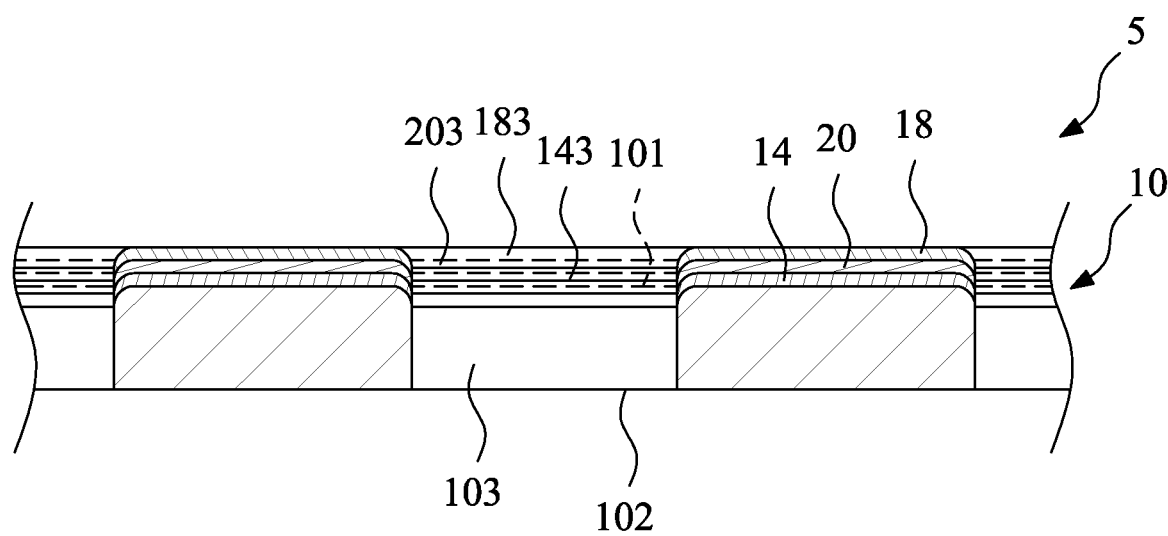

FIG. 12 to FIG. 14 illustrate schematic diagrams of process steps of a method for making a laminated composite material according to an embodiment of the present invention. Referring to FIG. 12, the base layer 10 is provided. Next, the protection layer 14 is formed on the first surface 101 of the base layer 10. Next, before the protection layer 14 is cured, a metal layer 20 is formed on the protection layer 14. The manner in which the metal layer 20 is formed is as follows. At first, a carrier 22 and a metal layer 20 (for example, gold, silver or copper) are provided, wherein the metal layer 20 is disposed on a surface of the carrier 22. As the thickness of the metal layer 20 is very thin, which is about 10 μm to 30 μm, the carrier 22 with a greater thickness is required to carry it. Next, the metal layer 20 is bonded to the protection layer 14.

Referring to FIG. 13, the carrier 22 is torn. At this point, since the adhesion force between the metal layer 20 and the protection layer 14 is greater than the binding force between the metal layer 20 and the carrier 22, one part of the metal layer 20 may remain on the entity part of the protection layer 14 and is not taken away. The remaining metal layer 20 is disposed on the protection layer 14, and is conformal with the protection layer 14. The metal layer 20 does not cover the through holes 103. In one embodiment, the metal layer 20 is merely disposed on the top surface of the protection layer 14 but not in the penetration holes 143; in another embodiment, a portion of the metal layer 20 extends to an upper portion of sidewalls of the penetration holes 143 of the protection layer 14, but does not completely cover the sidewalls of the penetration holes 143. The metal layer 20 can exhibit metallic luster. After the carrier 22 is completely torn, the metal layer 20 has a plurality of penetration holes 203. The sizes and locations of the penetration holes 203 of the metal layer 20 correspond to the sizes and locations of the penetration holes 143 of the protection layer 14.

Referring to FIG. 14, the anti-wear layer 18 is formed on the metal layer 20 so as to obtain a laminated composite material 5. In other embodiment, the laminated composite material 5 further includes the bottom layer 12 disposed on the second surface 102 of the base layer 10, as shown in FIGS. 3 and 4.

Referring to FIG. 14 again, a schematic cross-sectional diagram of a laminated composite material 5 according to an embodiment the present invention is illustrated. The laminated composite material 5 of this embodiment is similar to the laminated composite material 3 as shown in FIG. 10, and the difference is described as follows. The laminated composite material 5 of this embodiment further includes a metal layer 20 disposed between the protection layer 14 and the anti-wear layer 18 and conformal with the protection layer 14. The metal layer 20 does not cover the through holes 103 of the base layer 10.

Figure 15:
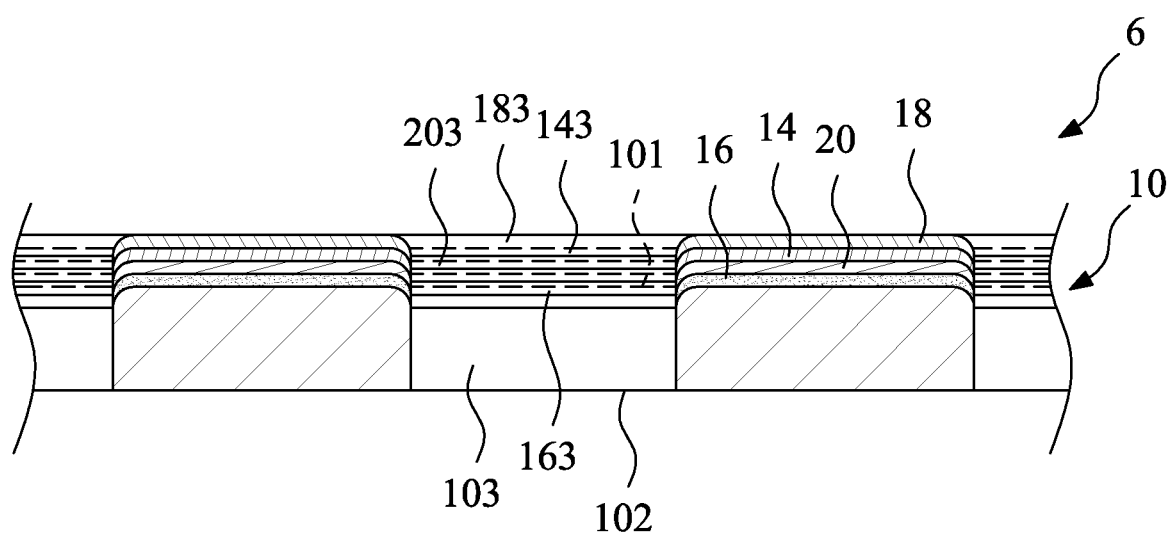
FIG. 15 illustrates a schematic cross-sectional diagram of a laminated composite material according to an embodiment the present invention.

FIG. 15 illustrates a schematic cross-sectional diagram of a laminated composite material 6 according to an embodiment the present invention. The laminated composite material 6 of this embodiment is similar to the laminated composite material 4 as shown in FIG. 11, and the difference is described as follows. The laminated composite material 6 of this embodiment further includes a metal layer 20 disposed between the protection layer 14 and the adhesive layer 16 and conformal with the protection layer 14. The metal layer 20 does not cover the through holes 103 of the base layer 10. Thus, the method for making the laminated composite material 6 of this embodiment is described as follows. At first, the adhesive layer 16 is formed on the first surface 101 of the base layer 10. Next, the metal layer 20 is formed on the adhesive layer 16. Next, the protection layer 14 is formed on the metal layer 20. Then, the anti-wear layer 18 is formed on the protection layer 14.

The above embodiments only describe the principle and the efficacies of the present invention, and are not used to limit the present invention. Therefore, modifications and variations of the embodiments made by persons skilled in the art do not depart from the spirit of the invention. The scope of the present invention should fall within the scope as defined in the appended claims.

What is claimed is:

1. A method for making a laminated composite material, comprising:
   (a) providing a base layer, the base layer having a first surface, a second surface and a plurality of through holes, the second surface being opposite to the first surface, and the through holes extending from the first surface of the base layer to the second surface of the base layer to penetrate through the base layer, wherein the base layer is a mesh cloth, a woven fabric or a three-dimensional sandwich mesh cloth;
   (a1) disposing a bottom layer on the second surface of the base layer, wherein the bottom layer has a first surface, a second surface and a plurality of air venting holes, the air venting holes extend from the first surface of the bottom layer to the second surface of the bottom layer to penetrate through the bottom layer, the first surface of the bottom layer contacts the second surface of the base layer, the size of the air venting holes of the bottom layer is smaller than the size of the through holes of the base layer; and
   (b) forming a protection layer over the first surface of the base layer, wherein the protection layer has a plurality of penetration holes, the sizes and locations of the penetration holes correspond to the sizes and locations of the through holes of the base layer, and the protection layer extends to a sidewall of the through hole, wherein the protection layer is formed by curing a hot melt adhesive or a high-solid-content layer, the material of the hot melt adhesive is a thermoplastic urethane (TPU) solution, the material of the high-solid-content layer is a polyurethane (PU) solution, a polycarbonate (PC) solution, a polyethylene (PE) solution or a polypropylene (PP) solution, and solid content thereof is 20 wt % to 95 wt %.

2. The method according to claim 1, wherein step (b) comprises:
   (b1) providing a mesh treatment wheel, wherein a surface of the mesh treatment wheel has a plurality of grooves cross each other to define a mesh number;
   (b2) attaching a liquid material to the grooves of the mesh treatment wheel;
   (b3) making the mesh treatment wheel contact the first surface of the base layer so as to adhere the liquid material to the first surface of the base layer; and
   (b4) curing the liquid material to form the protection layer.

3. The method according to claim 1, wherein step (b) comprises:
   (b1) providing a protective film, wherein the protective film is a sheet structure, and the size of the protective film corresponds to the size of the base layer;
   (b2) disposing the protective film on the first surface of the base layer;
   (b3) providing a hot air above the protective film, wherein the hot air blows toward the protective film so as to blow away a part of the protective film corresponding to the through holes of the base layer; and
   (b4) curing the other part of the protective film remaining on the base layer so as to form the protection layer.

4. The method according to claim 1, wherein after step (b), the method further comprises a step of forming an anti-wear layer on the protection layer, the anti-wear layer is conformal with the protection layer, and the anti-wear layer does not cover the through holes.

5. The method according to claim 1, wherein after step (a), the method further comprises a step of forming an adhesive layer on the first surface of the base layer, and a step of forming a metal layer on the adhesive layer, wherein the adhesive layer has a plurality of penetration holes, and the sizes and the locations of the penetration holes of the adhesive layer correspond to the sizes and the locations of the through holes of the base layer; in step (b), the protection layer is formed on the metal layer; and after step (b), the method further comprises a step of forming an anti-wear layer on the protection layer.

* * * * *